United States Patent [19]

Aoki

[11] 4,422,843

[45] Dec. 27, 1983

[54] INJECTION STRETCHING BLOW MOLDING MACHINE

[76] Inventor: Katashi Aoki, 6037 Ohazaminamijo, Sakakimachi, Hanishina-gun, Nagano-ken, Japan

[21] Appl. No.: 356,919

[22] Filed: Mar. 10, 1982

[30] Foreign Application Priority Data

Mar. 13, 1981 [JP] Japan .................................. 56-36912

[51] Int. Cl.³ .............................................. B29C 17/07
[52] U.S. Cl. .................................. 425/525; 264/532; 264/538; 425/526; 425/529; 425/533
[58] Field of Search .................. 264/532, 538, 535; 425/525, 526, 529, 533, 144

[56] References Cited

U.S. PATENT DOCUMENTS

| | | | |
|---|---|---|---|
| 2,331,687 | 10/1943 | Hobson | 425/533 X |
| 3,850,562 | 11/1974 | Takeuchi et al. | 425/533 X |
| 3,944,643 | 3/1976 | Sato et al. | 264/538 X |
| 4,105,391 | 8/1978 | Aoki | 425/526 |

Primary Examiner—Jan H. Silbaugh
Attorney, Agent, or Firm—Ostrolenk, Faber, Gerb & Soffen

[57] ABSTRACT

A molding machine disclosed herein comprises a rotary disk having the required number of openable and closeable neck molds, said rotary disk being located on the underside of a base plate, said rotary disk being capable of achieving intermittent rotation to successively transport said neck molds to an injection molding stage, a temperature control stage, a stretching blow molding stage and a molded product releasing stage for continuous operation from the injection molding of bottomed parisons formed of synthetic resin to the releasing of hollow molded products such as bottles subjected to the stretching and blow molding. In the present invention, arranged movably up and down on the base plate is a single actuating plate extending over individual operating stages consisting of the temperature control stage, the stretching and blow molding stage and the releasing stage, and members required for the temperature control of the injection molded parisons, the stretching blowing and the releasing of the hollow molded products are mounted on three sides of the actuating plate whereby the function of the single actuating plate is made possible to simultaneously actuate three operating stages which consist of the temperature control stage, the stretching and blow molding stage and the releasing stage.

6 Claims, 4 Drawing Figures

INJECTION STRETCHING BLOW MOLDING MACHINE

BACKGROUND OF THE INVENTION

In an injection stretching blow molding machine disclosed in U.S. Pat. No. 4,105,391 previously invented by the present inventor, wherein a rotary disk, which is rotated by a driving device provided in the middle of the upper surface of a base plate, is provided on the underside of the base plate, the required number of neck molds are attached to the under-surface of and parallel to a tangent line of the rotary disk, and an injection molding mold, a temperature control member and a blow mold are disposed between the rotary disk and a machine bed, whereby when the rotary disk is stopped, the steps of injection molding parisons, temperature controlling, stretching blow molding hollow molded products and releasing are carried out, there are provided an injection mold, a temperature control member, a blow mold and a mold closing mechanism between the rotary disk and the machine bed. This blow mold is opened and closed in a diametrical direction of the rotary disk by a mold opening and closing mechanism secured to the lower base plate, and in the state where the mold is open, laterally receives said neck mold parallel to the tangent line. When the rotary disk is stopped, the mold is closed by said mold opening and closing mechanism from both sides of the neck mold.

On the base plate of the injection stretching blow molding machine there are provided, for individual operating portions of a temperature control stage, a stretching blow molding stage and a releasing stage, devices which insert a core, a rod, a releasing member or the like into a parison or a hollow molded product, or into a neck mold passing through the base plate and the rotary disk and return them to their original position.

For this reason, formation of larger machine which inevitably widens an area of the base plate can be done more readily than the case of formation of smaller machine, and there gives rise to a limitation in forming the smaller machine under the construction without modification.

Also, in terms of construction, there poses problems in that if lifting devices must be provided for the individual operating portions, devices become necessary to individually and simultaneously operate such lifting devices and that control devices become complicated proportional to the number of the lifting devices. These are economically disadvantageous.

BRIEF SUMMARY OF THE INVENTION

It is therefore the primary object of the present invention to eliminate the above-described disadvantages caused to occur in the injection stretching blow molding machine which was previously invented by the present inventor.

Another object of the present invention is to provide a new and improved injection stretching blow molding machine in which even the case of a small machine with an area of a base plate limited to a small area, cores, stretching blowing mechanisms and members required for various steps from the injection molding of parisons to the releasing of hollow molded products may be installed on the upper surface of the base plate together with a driving device for a rotary disk.

A further object of the present invention is to provide an injection stretching blow molding machine in which a core in a temperature control stage, a blow core and a stretching blowing mechanism in a stretching blow molding stage, a wedge-like member for pushing-open a core and a neck mold in a releasing stage for hollow molded products, and the like may be moved up and down by means of a single common lifting device to thereby achieve the simplification of the machine and the saving of control members incidental to the lifting device and which is suitable for volume production of synthetic resin bottles or hollow molded products having a small capacity and has an excellent inexpensiveness.

That is, the aforementioned three operating stages and a single actuating plate are placed movably up and down on the upper surface of the base plate, and the core, the stretching blowing mechanism and members in the individual operating stages are mounted on the actuating plate, the individual operating stages being simultaneously actuated by the function of the actuating plate.

With such a structure as described above, the lifting device having been required for each operating stage need not be provided. A single device for moving the actuating plate up and down may merely be disposed on the upper surface of the base plate together with a plurality of guide members for guiding the actuating plate movably in a vertical direction and retaining the same. The lifting devices for the temperature control core, the blow core, the releasing member and the like and means for actuating and controlling these devices need not be provided.

Further, the base plate merely needs to have an area enough to mount a member for retaining the actuating plate movably up and down together with a driving device for intermittently rotating the rotary disk in the middle portion whereby the injection stretching blow molding machine may be further reduced in size.

BRIEF DESCRIPTION OF THE DRAWINGS

The injection stretching and blow molding machine in accordance with the present invention is illustrated without showing the detailed portions in the accompanying drawings, in which.

DESCRIPTION OF THE PREFERRED EMBODIMENTS

Figure 1:
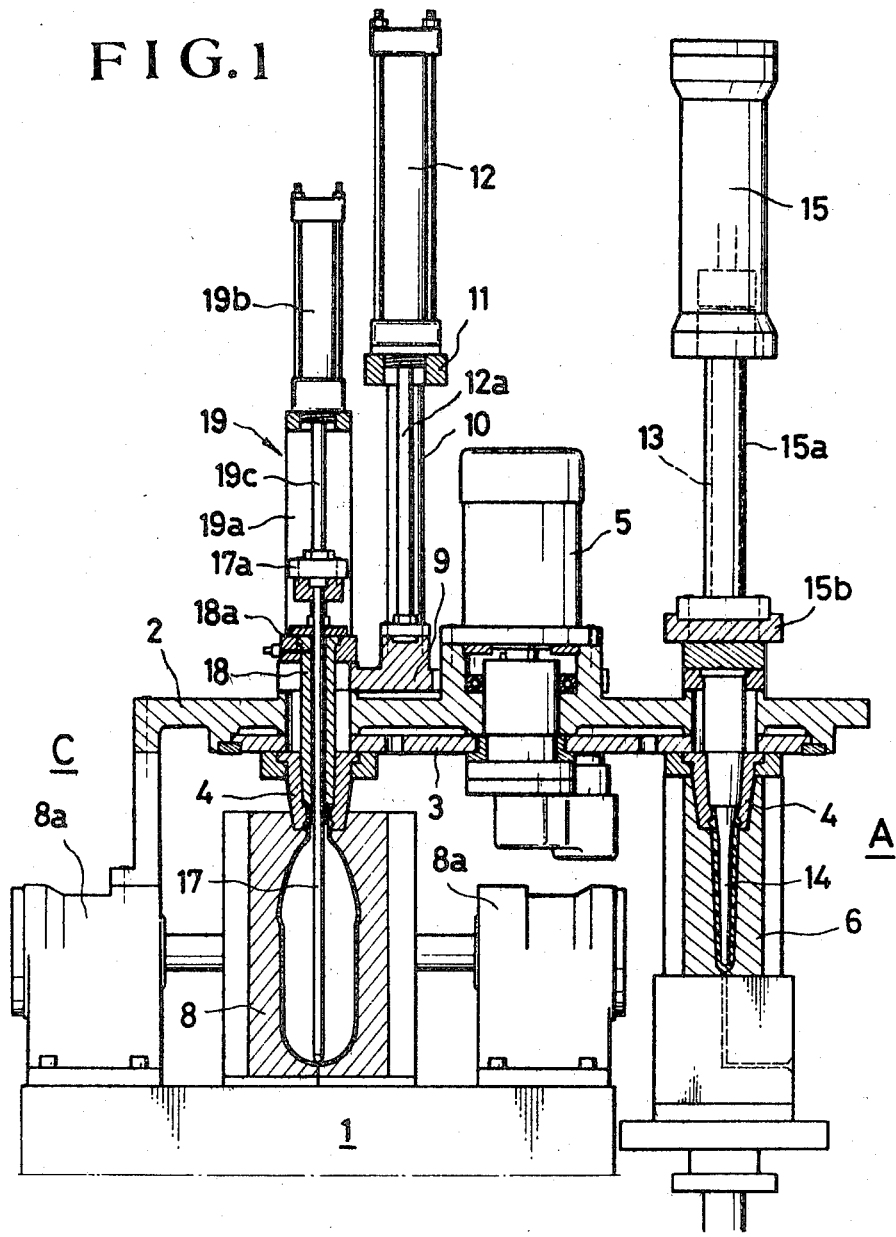
FIG. 1 is a longitudinal sectional elevation at the time of molding.
Figure 2:
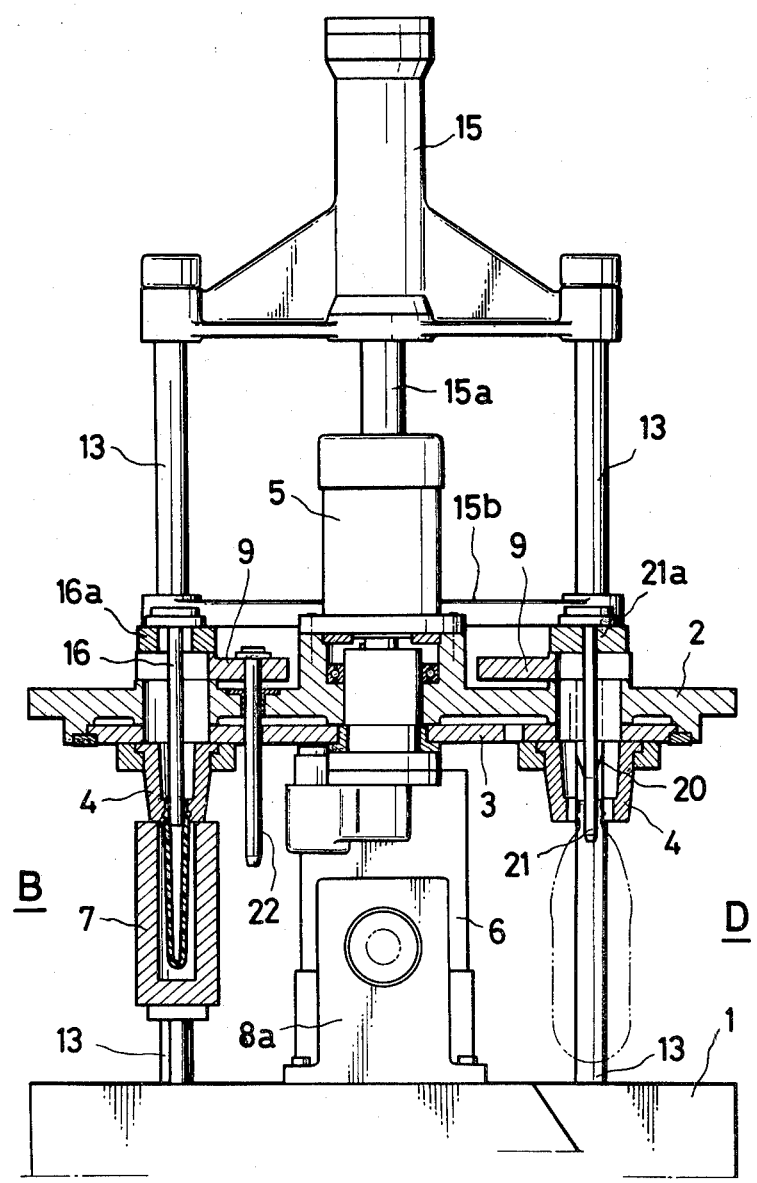
FIG. 2 is a longitudinal sectional side view at the time of molding.
Figure 3:
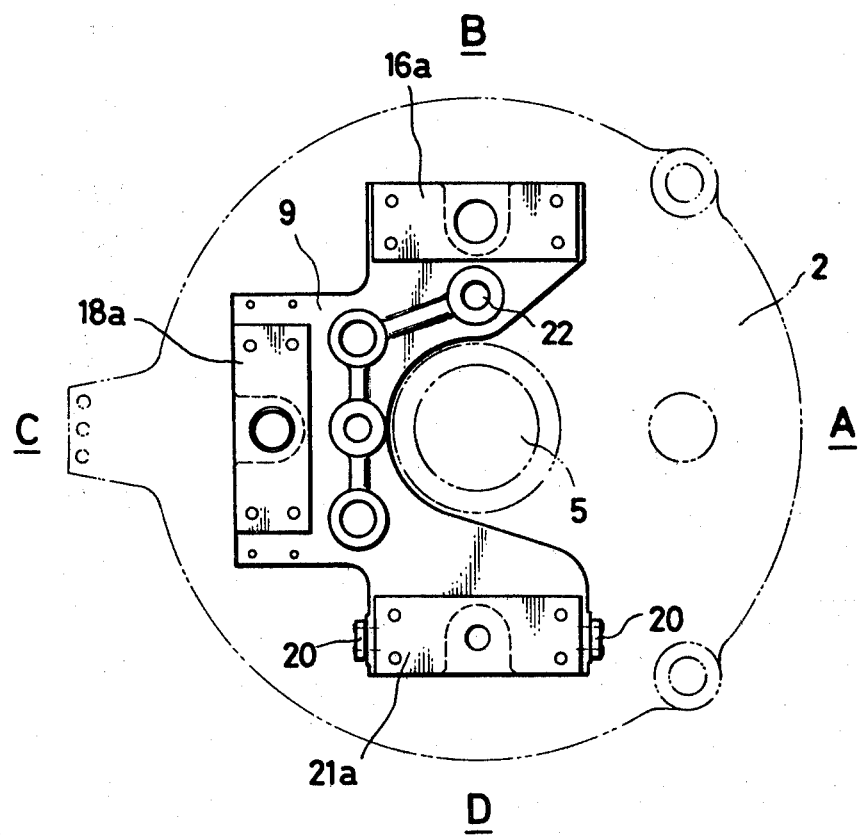
FIG. 3 is a plan view of an actuating plate with a base plate shown by a chain line.
Figure 4:
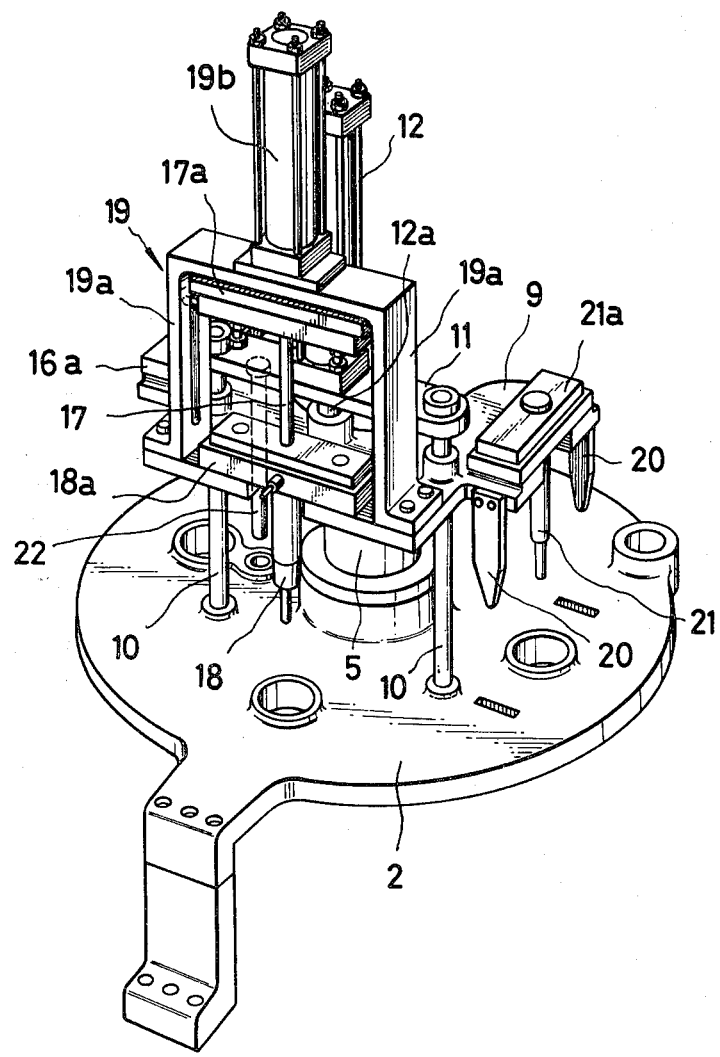
FIG. 4 is a perspective view showing the actuating plate and the base plate.

The specific embodiment of the present invention will now be described in detail in conjunction with the accompanying drawings.

A base plate 2 is horizontally disposed above a machine bed 1 leaving a predetermined space. A rotary disk 3 is fitted to the underside of the base plate 2, which rotary disk 3 has radially openable and closeable neck molds 4 positioned on the under-surface thereof for every 90 degrees. A driving device 5 in the form of a rotary actuator for intermittently rotating the rotary disk 3 for every 90 degrees is positioned in the middle portion of the base plate 2.

On the four sides of the machine bed 1, there are formed an injection molding stage A, a temperature control stage B, a stretching and blow molding stage C and a molded product releasing stage D, and the rotary disk 3 is stopped at a position where the neck molds 4 face the respective stage, so that during the stoppage of the rotary disk, the respective steps of molding parisons, temperature controlling, stretching and blow molding, and hollow molded product releasing are carried out.

Between the machine bed 1 and the base plate 2 in the injection molding stage A there is provided an injection mold 6 which is vertically opened and closed and clamped by means of a hydraulic device.

Between the machine bed 1 and the base plate 2 in the temperature control stage B there is provided movably up and down a temperature control pot 7 having a heating means, and a blow mold 8 horizontally opened and closed and clamped is provided (with hydraulic mechanisms 8a) in the stretching and blow molding stage C.

On the base plate 2 there is an actuating plate 9 of the size extending three sides, that is, the temperature control stage B, the stretching and blow molding stage C and the releasing stage D. The three sides to which the actuating plate 9 is extended are formed with recesses in which individual cores are positioned.

Two guide rods 10 are stood in parallel on the base plate, said rods being connected at their tops by means of a plate 11. The actuating plate 9 has a middle portion inserted through the guide rods 10 and is retained movably up and down and horizontally. The actuating plate 9 is also connected to a piston rod 12a of a lifting device 12 in the form of an air cylinder mounted vertically on the connecting plate 11.

Further, a hydraulic cylinder 15 is vertically secured to a portion which lies to the injection molding stage A of the base plate 2, over a tie bar 13 also serving as a support of the base plate 2. Connected to a die plate 15b mounted on the extreme end of a ram 15a of the hydraulic cylinder 15 is an injection core 14 received in the injection mold 6 extending through the base plate 2 and the rotary disk 3.

A temperature control core 16 is vertically mounted by means of a fixing plate 16a on a portion which lies to the temperature control stage B of the actuating plate 9.

A bed seat 19 assembled into a gate-shape is mounted on a portion which lies to the stretching blow molding stage C of the actuating plate 9.

A blow core 18 is vertically mounted on a fixed plate 18a at the lower end of the bed seat 18, the blow core 18 having a stretching rod 17 inserted therethrough.

The stretching rod 17 is connected to a member 17a which is moved up and down internally of two columns 19a of the bed seat 19, the member 17a being connected to a piston rod 19c of an air cylinder 19b vertically secured to the top of the bed seat 19.

A portion which lies to the releasing stage D of the actuating plate 9 is provided with a pair of wedge-shaped neck mold opening members 20 mounted with a side of the projected portion utilized, and a releasing core 21 mounted on the middle portion of the member 20 by a fixed plate 21a.

The core 21 is inserted into the hollow molded product before the member extends through the base plate 2 and the rotary disk 3 to be forced into the neck mold 4 to open the neck mold.

A locating pin 22 is vertically mounted on a portion adjacent to the temperature control stage B of the actuating plate 9. This pin 22 is provided so that it is inserted into both the base plate 2 and the rotary disk 3 in order to always control the stopping position of the neck mold 4 at a predetermined position.

In the injection stretching blow molding machine as constructed above, when the rotary disk 3 is stopped, the actuating plate 9 is moved down to the base plate by the function of the lifting device. With this downward movement, the pin 22 first extends through the base plate 2 and the rotary plate 3 to adjust the stopping position of the neck mold 4. Subsequently, the temperature control core 16, the blow core 18 and the releasing core 21 extend through the base plate 2 and the rotary disk 3, and the releasing member 20 is further driven into the neck mold 4.

In the stretching blow molding stage C, the blow core 18 is inserted into the neck mold, and successively the stretching rod 17 is stretched by the operation of the air cylinder 19a to stretch the parison within the blow mold in an axial direction. Then, a hollow molded product is molded by applying an air blow.

When the actuating plate 9 is moved up, the core, the pin or other members are simultaneously moved up onto the base plate and returned to their original position to render the rotary disk 3 rotatable.

What is claimed is:

1. An injection, stretching and blow molding machine for parisons, comprising:
   a machine bed; a base plate supported spaced above and parallel to the machine bed; a rotary disk supported to the base plate; a plurality of spaced apart neck molds, each for the neck of a respective parison, being supported at the disk, for the parison to be supported at the neck mold and beneath the disk; drive means connected with the disk for rotating the disk, at spaced time intervals, with respect to the base plate;
   at spaced locations on the machine bed, there are defined, in the following sequence, around the disk, and located stationary with respect to the rotating disk, the following stages:
   (a) an injection molding stage comprising: an injection mold for injection molding each parison in turn;
   (b) a temperature control stage, comprising: a temperature control core for movement down into and up out of a parison which has been formed in the injection mold and which is supported at this stage by the neck mold; the temperature control core being heatable;
   (c) a stretching and blow molding stage, comprising: a blow mold device, including a blow mold for the parison then at the stretching and blow molding stage and which is supported at this stage by the neck mold; a blow core and a stretching and blowing mechanism for the parison and both being movable up and down, with the blow core having movement down into and up out of the parison supported at that stage;
   (d) a molded product release stage, including a releasing core for opening the neck mold for releasing a molded parison held by the neck mold; the releasing core being movable up and movable down, with the downward movement operating the neck mold to release the parison at that stage;
   an actuating plate on the base plate and extending around the disk to the temperature control stage, the stretching blow molding stage and the releasing stage without extending to the injection molding stage; a lifting device for moving the actuating plate up and down and with respect to the base plate, and guide means for guiding the actuating plate up and down movement;

the temperature control core, the blow core and the stretching and blowing mechanism, and the releasing core being mounted on the actuating plate to all move up and down together.

2. The machine of claim 1, wherein the disk has an undersurface and the neck molds are supported at the undersurface of the disk.

3. An injection stretching and blow molding machine according to claim 1, wherein there is provided a locating pin mounted on the actuating plate for moving up and down with the actuating plate; openings in the base plate and the rotary disk for receiving the locating pin as the actuating plate is moved toward the base plate and the disk and those openings in the base plate and the disk being placed for fixing the positions of the neck molds precisely at the stages.

4. An injection stretching and blow molding machine according to claim 1, further comprising a guide rod upstanding on the base plate, and the actuating plate being connected with the guide rod for guiding up and down motion of the actuating plate.

5. An injection stretching and blow molding machine according to claim 1, further comprising a plurality of guide rods upstanding from and in parallel on the base plate, a connecting plate provided on the guide rods, the lifting device being vertically mounted on the connecting plate, and the lifting device including a piston rod coupled to the actuating plate for moving the actuating plate up and down.

6. An injection stretching and blow molding machine according to claim 1, wherein the stretching and blowing mechanism comprises a gate-shaped bed seat mounted together with a fixed plate on a portion which lies at the stretching blow molding stage and at the actuating plate, a fixed plate, a blow core vertically mounted on the fixed plate, a stretching rod inserted though the blow core and mounted on a member which is movable internally of the bed seat, an air cylinder vertically secured to the bed seat, the air cylinder including a piston rod coupled to the movable member for moving the stretching rod down and up.

* * * * *